United States Patent Office 3,766,155
Patented Oct. 16, 1973

3,766,155
METHOD FOR THE POLYMERIZATION OF ISOOLEFIN
Shunsuke Matsushima, Ibaraki, and Katsuji Ueno, Hirakata, Japan, assignors to Sumitomo Chemical Company, Limited
No Drawing. Filed Dec. 23, 1971, Ser. No. 211,650
Claims priority, application Japan, Dec. 29, 1970, 46/124,417
Int. Cl. C08d 3/04; C08f 3/14
U.S. Cl. 260—85.3 R          13 Claims

ABSTRACT OF THE DISCLOSURE

A method for producing isoolefin homopolymers or copolymers is provided herein, which comprises polymerizing or copolymerizing an isoolefin, a mixture thereof, or a mixture of an isoolefin and diolefin copolymerizable therewith in the presence of a catalyst system comprising (1) a metal organic amide represented by the general formula, $M(NR_2)_mX_n$, wherein M is a metal atom, $m+n$ is the valence of the metal atom, R is an alkyl radical having from 1 to 12 carbon atoms, an aryl radical having from 6 to 10 carbon atoms, an aralkyl radical having from 7 to 12 carbon atoms, a cycloalkyl radical having from 6 to 10 carbon atoms, or a halogenated substituted thereof, and R's may be the same or different, and X is a halogen atom, and (2) boron trifluoride. The present invention is also directed to the above-defined catalyst combination, per se, useful for producing isoolefin polymers. By the use of the above catalyst system it is possible to produce isoolefin polymers having a high degree of polymerization at comparatively higher temperatures than conventional catalyst systems.

---

This invention relates to a method of polymerizing an isoolefin. More particularly, the present invention relates to a method of producing isoolefin homopolymers or copolymers, namely butyl type rubbers, which comprises polymerizing or copolymerizing an isoolefin, a mixture thereof, or a mixture of an isoolefin and a multiolefin in the presence of a particular catalyst system.

A number of catalyst systems for producing butyl type rubber have hitherto been proposed. For example, metal halides of the Friedel-Crafts type catalyst have been proposed. Among these, a solution of aluminum chloride in methyl chloride or in ethyl chloride has been most frequently used for the production of butyl type rubbers. However, these catalysts require a temperature as low as about −100° C. Such a low temperature is not desirable from an industrial or economic point of view.

Thus, many attempts have been made to produce, at a comparatively high temperature, isoolefin polymers of a high degree of polymerization suitable for practical use. For example, as for the methods for producing high molecular weight isobutylene polymers at a comparatively high temperature, there is known a method of polymerizing isobutylene in the presence of a catalyst system of $Et_2AlCl$-tert.-BuCl in a polar solvent such as methylene chloride (Japanese patent publication No. 2,471/1969) or in the presence of a catalyst system of $Al(O\ sec.-butyl)_3BF_3$-$TiCl_4$ (J. Polymer Sci., 53, 281).

It is an object of the present invention to provide a method of producing isoolefin homopolymers or copolymers having a high degree of polymerization.

Another object of the invention is to provide isobutylene homopolymers or copolymers having a high degree of polymerization.

Still another object of the invention is to provide a butyl type rubber of a high molecular weight, namely a copolymer of isoolefin such as isoutylene and a multiolefin copolymerizable therewith such as isoprene, at a considerably higher temperature than that which has been possible hitherto.

Other objects and advantages will be apparent from the following description.

We have now found that the use of a catalyst system comprising (1) a metal organic amide and (2) boron trifluoride is effective for producing isoolefin homopolymers or copolymers having a high molecular weight at a comparatively higher temperature than that required when a Friedel-Crafts type catalyst such as boron trifluoride or aluminum chloride is singly employed.

The present invention is based on the above discovery and relates to an improved method of producing isoolefin homopolymers or copolymers. The method comprises polymerizing or copolymerizing an isoolefin, a mixture thereof, or a mixture of an isoolefin and a multiolefin copolymerizable therewith in the presence of a catalyst system comprising (1) a metal organic amide represented by the general formula $M(NR_2)_mX_n$, wherein M is a metal atom, $m+n$ is the valence of the metal atom, R is an alkyl radical having from 1 to 12 carbon atoms, an aryl radical having from 6 to 10 carbon atoms, an aralkyl radical having from 7 to 12 carbon atoms, a cycloalkyl radical having from 6 to 10 carbon atoms or a halogenated substitute thereof, and R's may be same or different, and X is a halogen atom, and (2) boron trifluoride.

The metal atom in the metal organic amide $$M(NR_2)_mX_n$$

is Zn, Al, Ti, Sn, Si, Zr, etc. and R represents an alkyl radical such as methyl, ethyl, n-propyl, isopropyl, n-butyl, sec-butyl, tert-butyl, n-amyl, iso-amyl, n-hexyl, isohexyl, n-heptyl, n-octyl, 2-ethylhexyl, etc.; a cycloalkyl radical such as cyclopentyl, methylcyclopentyl, etc.; an aryl radical such as phenyl, toluyl, xylyl, cumenyl, naphthyl, etc.; an aralkyl radical such as benzyl, phenethyl, etc. and a halogen substitute thereof. X represents F, Cl, Br and I.

Representative examples of the metal organic amide having the above general formula are $Zn(N\ iso-butyl_2)_2$, $Zn(N\ ethyl_2)_2$, $Zn(N\ n-butyl_2)_2$, $Zn(N\ phenyl_2)_2$, $$Al(N\ ethyl_2)_{1.5}Cl_{1.5},$$

$Ti(N\ ethyl_2)_4$, $Si(N\ ethyl_2)_4$ and $Zr(N\ n-butyl_2)_4$.

Any of these compounds, when used alone, has no catalytic activity to polymerize isobutylene, but when used in combination with boron trifluoride exhibits a catalytic activity quite different from the known Friedel-Crafts type catalysts, and enables the production of isobutylene polymers of a high degree of polymerization even at a comparatively high temperature.

The metal organic amide to be used in the present invention can be synthesized for example, by reacting a lithium amide $LiNR_2$ (produced by the reaction of an organic radical disubstituted amine $HNR_2$ with metallic lithium) with a metal chloride, and also can be easily synthesized by reacting an alkyl metal $MR'_{m+n}$ or an alkyl metal halide $MR'_mX_n$, wherein R' is an alkyl radical, with an organic radical disubstituted amine $HNR_2$. Many of these metal organic amides i.e. $M(NR_2)_mX_n$ can be purified by distillation. They are also easily soluble in many inert solvents such as hydrocarbons (for example, n-heptane, benzene and the like) and halogenated hydrocarbons (for example, methyl chloride, ethyl chloride and the like). Thus, they are convenient when supplied to a polymerization system or when polymerized, because of their solubility in such solvents. In addition, in the polymerization, even by the further addition of boron fluoride, these amides do not form any precipitate and therefore do not cause uneven polymerization. Thus, the catalysts of the present invention may be advantageously separated from the reaction system after the polymerization.

The isoolefins to be used in the present invention are those having from 4 to 8 carbon atoms. Representative examples of these compounds include isobutylene, 2-methyl-1-butene, 3-methyl-1-butene, 2-methyl-2-butene, 4-methyl-1-pentene and a mixture thereof. Also cationic polymerizable compounds, for example, styrene, α-methylstyrene and the like can also be used as isoolefins.

The multiolefins copolymerizable with the above described isoolefins are those having from 4 to 14 carbon atoms. Representative examples of these compounds include isoprene, 1,3-butadiene, 2,3-dimethyl-1,3-butadiene, 6,6-dimethylfulvene, piperylene, cyclopentadiene, dicyclopentadiene, divinylbenzene, cyclohexadiene, vinylcyclohexene, and the like.

The butyl type rubbery polymers can be obtained by copolymerizing isoolefin as a major part of the total compounds used, for example in an amount of from about 70 to 99.5% by weight, preferably from 85 to 99.5% by weight with a multiolefin as a minor part, for example in an amount of from about 30 to 0.5% by weight, preferably from 15 to 0.5% by weight. Particularly preferred polymers are obtained by copolymerizing from 95 to 99.5% by weight of isobutylene with from 5 to 0.5% by weight of isoprene.

Isoolefins, even in their single use, can be polymerized to produce useful polymers. For example isobutylene, when polymerized singly, forms polyisobutylene of a high degree of polymerization. Isoolefin may be also copolymerized with other polymerizable monoolefins such as styrene.

Further, by the use of the catalyst system of this present invention, useful and low molecular weight polymers can also be obtained. When a considerable amount of a multiolefin, for example 30 to 5% by weight of isoprene, is copolymerized with isoolefin, for example 70 to 95% by weight of isobutylene, at any desired temperature, butyl rubbers having a low, number average molecular weight of 1000 to 50,000 can be produced in syrup- or grease-like form. As they have a narrow width of molecular weight distribution, they are low in spinnability and are therefore easy to process into elastic sealants with or without dilution in a solvent. Their high strength after vulcanization seems to result from comparatively uniform lengths of the molecule.

The polymerization is generally conducted in an inert solvent so as to facilitate the operation. Any type of solvent which is inert under the polymerization conditions can be used. Examples of such solvents are conventional halogenated hydrocarbons (for example, methyl chloride, ethyl chloride, chlorobenzene, methyl bromide and carbon tetrachloride), carbon disulfide, saturated hydrocarbons (for example, n-hexane, n-heptane and the like), unsaturated hydrocarbons (for example, ethylene, propylene and the like), aromatic hydrocarbons (for example, benzene, toluene and the like) and mixtures thereof.

The amount of the catalyst to be used in the present invention is from 2 to 0.001% by mole, preferably from 1 to 0.01% by mole for the organic metal amide compound and from 10 to 0.001% by mole, preferably from 5 to 0.02% by mole, for boron trifluoride, based on the starting material.

For carrying out smoothly the method of the present invention, either the bulk or solution polymerization can be selected and the polymerization may be conducted batchwise or continuously.

When polymerizing by using the catalyst system of the present invention, the polymerization can be accelerated or controlled by the presence of a polar substance such as, water, alcohols, organic carboxylic acids, etc. Such has been well known for the Friedel-Crafts type catalysts and this is also the case for the catalyst system of the present invention.

The polymerization temperature is generally below 0° C., but the temperature can be suitably selected according to the desired properties of the polymer.

The following examples are given for the illustration purpose only and not for limiting the scope of the invention in any way.

Examples 1–8 and Comparative Example 1

To a 300 ml. flask, 33.7 g. isobutylene and 150 ml. n-heptane were charged. Further, 0.5 millimole of a metal organic amide was added and cooled to a polymerization temperature. While stirring this reaction solution, an amount of $BF_3$ was introduced into the upper space of the flask. After polymerization for one hour, ethanol was added to stop the reaction. On freeze-drying the thus obtained polymerized substance for one day, a white rubbery polymer was obtained. The results are shown in Table 1 together with the result obtained in Comparative Example 1 in which a metal organic amide was not added.

TABLE 1

|  | Example | | | | | | | | Comparative Example 1 |
|---|---|---|---|---|---|---|---|---|---|
|  | 1 | 2 | 3 | 4 | 5 | 6 | 7 | 8 |  |
| Metal organic amide | A | B | C | D | E | F | G | H |  |
| $BF_3$ (millimole) | 8 | 4.5 | 12 | 4.5 | 2.7 | 4.5 | 4.5 | 4.5 | 4.5 |
| Polymerization temperature (° C.) | −45 | −65 | −65 | −65 | −65 | −65 | −65 | −65 | −65 |
| Yield (g.) | 29.5 | 29.2 | 15.9 | 33.0 | 16.0 | 29.5 | 30.5 | 25.3 | 23.1 |
| Viscosity average molecular weight (thousand) | 600 | 1,010 | 850 | 1,100 | 320 | 720 | 910 | 530 | 95 |

Note.—A=Zn(N iso-Bu$_2$)$_2$; C=Al(N Et$_2$)$_{1.5}$Cl$_{1.5}$; E=Si(N Et$_2$)$_4$; G=Zn(N n-Bu$_2$)$_2$; B=Ti(N Et$_2$)$_4$; D=Zn(N Et$_2$)$_2$; F=Zn(N Ph$_2$)$_2$; H=Zr(N n-Bu$_2$)$_4$.

Examples 9–11 and Comparative Example 2

To a 300 ml. flask, 33.7 g. isobutylene, 0.67 g. isoprene and 150 ml. n-heptane were charged. Further, 0.5 millimole of a metal organic amide was added and cooled to a polymerization temperature. While being stirred this reaction solution, an amount of $BF_3$ was introduced into the upper space of the flask. After polymerization for one hour, ethanol was added to stop the reaction. On freeze-drying the thus obtained polymerized substance for one day, a white rubbery polymer was obtained. The results are shown in Table 2 together with the result of Comparative Example 2 in which a metal organic amide was not added.

TABLE 2

|  | Example | | | Comparative Example 2 |
|---|---|---|---|---|
|  | 9 | 10 | 11 |  |
| Metal organic amide | Zn(N Et$_2$)$_2$ | Zn(N iso-Bu$_2$)$_2$ | Ti(N Et$_2$)$_4$ |  |
| $BF_3$ (millimole) | 8 | 9 | 8 | 4.0 |
| Polymerization temperature (° C.) | −65 | −75 | −75 | −65 |
| Yield (g.) | 30.8 | 30.3 | 28.1 | 23.5 |
| Viscosity average molecular weight (thousand) | 540 | 680 | 480 | 12 |
| Double bond content (percent isoprene mole content) | 1.21 | 1.10 | 1.20 | 1.20 |

Examples 12–14 and Comparative Example 3

To a 300 ml. flask, 33.7 g. isobutylene, 0.68 g. isoprene and 150 ml. methyl chloride were charged. Then, an amount of metal organic amide was added thereto. While being stirred and cooled, $BF_3$ was introduced into the upper space of the flask. After polymerization for one hour, ethanol was added to stop the reaction. On freeze-drying the thus obtained polymerized substance for one day, a white rubbery polymer was obtained. The results are shown in Table 3 together with the result of Comparative Example 3 in which a metal organic amide was not added.

TABLE 3

|  | Example 12 | Example 13 | Example 14 | Comparative example 3 |
| --- | --- | --- | --- | --- |
| Metal organic amide | *I | Zn(N iso-Bu$_2$)$_2$ | Ti(N Et$_2$)$_4$ | |
| BF$_3$ (millimole) | 8 | 9 | 8 | 4 |
| Polymerization temperature (° C.) | −78 | −78 | −78 | 78 |
| Yield (g.) | 26.6 | 31.0 | 27.1 | 30.2 |
| Viscosity average molecular weight (thousand) | 680 | 800 | 620 | 98 |
| Double bond content (percent isoprene mole) | 1.18 | 1.13 | 1.21 | 1.23 |

*I = Zn(N iso-Bu$_2$)(N Et$_2$).

It is apparent from Examples 1–14 according to the method of the present invention that the higher molecular weight polymers than those obtained in Comparative Examples 1–3 in which the $BF_3$ catalyst was used singly were obtained.

Examples 15–16

To a 300 ml. flask, an amount of 2-methylbutene-1 or amounts of 2-methylbutene and isoprene were charged. Then, 150 ml. methyl chloride was added and 0.5 millimole of a metal organic amide was further added. While being stirred and cooled an amount of $BF_3$ was introduced into the upper space of the flask. After polymerization for one hour, ethanol was added to stop the reaction. The thus obtained polymerized substance was dissolved in benzene and on freeze-drying for one day, a white polymer was obtained. The results are shown in Table 4.

TABLE 4

| Example | 15 | 16 |
| --- | --- | --- |
| Metal organic amide | Al(N Et$_2$)$_{1.5}$Cl$_{1.5}$ | Zn(N iso-Bu$_2$)$_2$ |
| BF$_3$ (millimole) | 4.5 | 6.2 |
| 2-methylbutene-1 (g.) | 30.1 | 30.1 |
| Isoprene (g.) | | 16.0 |
| Polymerization temperature (°C.) | −45 | −45 |
| Viscosity average molecular weight (thousand) | 230 | 110 |
| Double bond content (percent isoprene mole) | | 0.7 |

Example 17

To a 300 ml. flask, 33.7 g. isobutylene and 2.55 g. isoprene were charged. 150 ml. n-heptane was added and then 0.5 millimole Zn(N iso-Bu$_2$)$_2$ was added. After cooling the mixture to −75° C. while being stirred, 9 millimoles of $BF_3$ was introduced. After polymerization for two hours, methanol was added to stop the reaction. On freeze-drying at 55° C. under reduced pressure, 28.1 g. of a semi-fluid polymer was obtained. The double bond content was 4.2 isoprene percent by mole, the viscosity average molecular weight 32,000, and the molecular weight distribution coefficient (weight average molecular weight/number average molecular weight) 3.2.

What is claimed is:

1. A method for producing isoolefin homopolymers or copolymers, which comprises polymerizing or copolymerizing an isoolefin, a mixture thereof, or a mixture of an isoolefin and a diolefin copolymerizable therewith in the presence of a catalyst system comprising (1) a metal organic amide represented by the general formula, $$M(NR_2)_m X_n$$

wherein M is a metal atom, $m+n$ is the valence of the metal atom, R is an alkyl radical having from 1 to 12 carbon atoms, an aryl radical having from 6 to 10 carbon atoms, an aralkyl radical having from 7 to 12 carbon atoms, a cycloalkyl radical having from 6 to 10 carbon atoms, or a halogenated substitute thereof, and R's may be same or different, and the X is a halogen atom, and (2) boron trifluoride.

2. A method according to claim 1 wherein the isoolefin is a member selected from the group consisting of isobutylene, 2-methylbutene-1, 3-methylbutene-1, 2-methylbutene-2 and 4-methylpentene-1.

3. A method according to claim 1 wherein the diolefin is a member selected from the group consisting of isoprene, butadiene-1,3, 2,3-dimethylbutadiene-1,3, 6,6-dimethylfulvene, piperylene, cyclopentadiene, dicyclopentadiene, divinylbenzene, cyclohexadiene and vinylcyclohexene.

4. A method according to claim 1 wherein 70 ot 99.5% by weight of the isoolefin is copolymerized with 30 to 0.5% by weight of the diolefin.

5. A method according to claim 1 wherein 95 to 99.5% by weight of isobutylene is copolymerized with from 5 to 0.5% by weight of isoprene.

6. A method according to claim 1 wherein the metal atom M is a member selected from the group consisting of Zn, Al, Ti, Si and Zr.

7. A method according to claim 1 wherein the metal organic amide is a member selected from the group consisting of Zn(N iso-butyl$_2$)$_2$, Zn(N ethyl$_2$)$_2$, Zn(N n-butyl$_2$)$_2$, Zn(N phenyl$_2$)$_2$, Al(N ethyl$_2$)$_{1.5}$Cl$_{1.5}$, Ti(N ethyl$_2$)$_4$, Si(N ethyl$_2$)$_4$ and Zr(N n-butyl$_2$)$_4$.

8. A method according to claim 1 wherein the metal organic amide is used in an amount from 2 to 0.001 mole percent based on the starting monomer.

9. A method according to claim 1 wherein boron trifluoride is used in an amount of from 10 to 0.001 mole percent based on the starting monomer.

10. A method according to claim 1 wherein the polymerization or copolymerization is carried out in the presence of a solvent.

11. A method according to claim 10 wherein the solvent is at least one selected from the group consisting of methyl chloride, chlorobenzene, ethylchloride, carbon tetrachloride, carbon disulfide, n-hexane, n-heptane, ethylene, propylene, benzene and toluene.

12. A method according to claim 1 wherein the polymerization is carried out at a temperature below 0° C.

13. A catalyst consisting essentially of (1) a metal organic amide represented by the general formula, $$M(NR_2)_m X_n$$

wherein M is a metal atom selected from the group consistign of Zn, Al, Ti, Sn and Zr, $m+n$ is the valence of the metal atom, R is an alkyl radical having 1 to 12 carbon atoms, an aryl radical having 6 to 10 carbon atoms, an aralkyl radical having 7 to 12 carbon atoms, a cycloalkyl radical having 6 to 10 carbon atoms, or a halogen substitute thereof, the R's being present in a total number of $2m$ per molecule may be same or different, and X is a halogen atom, and (2) boron trifluoride.

References Cited
UNITED STATES PATENTS

| | | | |
|---|---|---|---|
| 3,493,549 | 2/1970 | Uemura et al. | 260—85.3 R |
| 3,394,156 | 7/1968 | Kornicker et al. | 260—94.9 B |
| 3,392,160 | 7/1968 | Orzechowski | 252—431 N |
| 3,711,455 | 1/1973 | Cucinella et al. | 260—85.3 R |

JOSEPH L. SCHOFER, Primary Examiner

A. HOLLER, Assistant Examiner

U.S. Cl. X.R.

252—431 N, 433; 260—88.2 B, 93.7, 94.8, 94.9 B